(12) United States Patent
Neven

(10) Patent No.: US 9,091,574 B2
(45) Date of Patent: Jul. 28, 2015

(54) MAGNETIC-INDUCTIVE FLOW METER WITH A PARTIALLY CONSTRICTED MEASURING TUBE FLOW CROSS-SECTION

(71) Applicant: Krohne AG, Basel (CH)

(72) Inventor: Josef Neven, Mours St. Eusèbe (FR)

(73) Assignee: Krohne AG, Basel (CH)

( * ) Notice: Subject to any disclaimer, the term of this patent is extended or adjusted under 35 U.S.C. 154(b) by 177 days.

(21) Appl. No.: 13/687,313

(22) Filed: Nov. 28, 2012

(65) Prior Publication Data
US 2013/0145861 A1 Jun. 13, 2013

(30) Foreign Application Priority Data

Dec. 2, 2011 (DE) .......................... 10 2011 119 982

(51) Int. Cl.
*G01F 1/84* (2006.01)
*G01F 1/58* (2006.01)
*G01F 15/14* (2006.01)

(52) U.S. Cl.
CPC ................ *G01F 1/584* (2013.01); *G01F 1/588* (2013.01); *G01F 15/14* (2013.01)

(58) Field of Classification Search
None
See application file for complete search history.

(56) References Cited

U.S. PATENT DOCUMENTS

| 8,286,503 | B2 | 10/2012 | Neuburger et al. | |
|---|---|---|---|---|
| 2010/0126282 | A1* | 5/2010 | Neuburger et al. | 73/861.12 |
| 2010/0132478 | A1* | 6/2010 | Pelayo | 73/861.12 |
| 2010/0132479 | A1* | 6/2010 | van Willigen | 73/861.12 |

* cited by examiner

Primary Examiner — Harshad R Patel
(74) Attorney, Agent, or Firm — Roberts Mlotkowski Safran & Cole, P.C.; David S. Safran

(57) ABSTRACT

A magnetic-inductive flow meter including a measuring tube, a magnetic circuit device, and two electrodes for detecting a measurement voltage. The measuring tube includes an inflow section, a measurement section that adjoins an inflow section, and an outflow section that adjoins the measurement section. A flow cross section of the measurement section is smaller than an inlet-side flow cross section of the inflow section and smaller than an outlet-side flow cross section of the outflow section. The electrodes are located on or in opposite electrode sections in the measurement section.

19 Claims, 2 Drawing Sheets

MAGNETIC-INDUCTIVE FLOW METER WITH A PARTIALLY CONSTRICTED MEASURING TUBE FLOW CROSS-SECTION

BACKGROUND OF THE INVENTION

1. Field of the Invention

The invention relates to a magnetic-inductive flow meter with at least one measuring tube, at least one magnetic circuit device for implementing a magnetic circuit, and at least two electrodes for detecting a measurement voltage. The measuring tube has an inflow section, a measurement section, which adjoins the inflow section, and an outflow section, which adjoins the measurement section. A flow cross section of the measurement section is both smaller than an inlet-side flow cross section of the inflow section and smaller than an outlet-side flow cross section of the outflow section. The electrodes are located on or in opposite electrode sections in the measurement section of the measuring tube. Moreover, the invention also relates to a measuring tube for a magnetic-inductive flow meter.

2. Description of Related Art

The measurement engineering foundation for flow rate measurement with a conventional magnetic-inductive flow meter uses a measurement tube of a nonmagnetic material, for example, of a plastic or a nonmagnetic metal. The measuring tube is on a flow side in the region of the magnetic field generated by a magnetic circuit device. The measuring tube is not electrically conductive or is insulated electrically from the measurement fluid by an insulating lining. In operation, the magnetic field generated by the magnetic circuit device permeates the measuring tube at a measurement section in a direction that is essentially perpendicular to the flow direction. If a measurement fluid with a minimum electrical conductivity is flowing through the measuring tube, charge carriers in the conductive measurement fluid are deflected by the magnetic field. The charge carriers create an electrical potential difference on electrodes which are located perpendicular to the magnetic field and to the flow direction. The charge carriers are detected with a measurement device and are measured as a voltage. The measured voltage is proportional to the flow velocity of the charge carriers which are moved with the measurement fluid such that the flow rate in the measuring tube can be deduced from the flow velocity.

The sensitivity of the magnetic-inductive flow meter and the accuracy of the measurement which can be taken with the magnetic-inductive flow meter depend, among other things, on the magnetic field, which is generated with the magnetic circuit device in the region of the measurement section of the measuring tube, the geometry of the measurement section and the arrangement of the electrodes. The geometry of the arrangement relates to the homogeneity of the magnetic field produced in the region of the measurement section, the flow conditions of the measurement fluid in the measurement section and, thus, also the electrical field generated by the charge separation in the measurement section, which is the basis for the measurement. The tuning of these different components of the magnetic-inductive flow meter to one another is crucial to attain accurate measurements.

Varying the cross section of the measuring tube beyond its longitudinal extension and, therefore beyond its extension in the flow direction is known from the conventional art. The inlet-side flow cross section of the inflow section conventionally has the geometry of the process connection. Therefore, conventionally, a circular flow cross section having the nominal width of the pipe in the process is connected to the magnetic-inductive flow meter. The corresponding applies to the outlet-side flow cross section of the outflow section, which likewise faces the process and which can be connected to the process. When "flow cross section" is addressed here, it always means the free cross sectional area of the measuring tube which has been measured perpendicular to the flow direction and which is available to the flow, and, therefore without the wall thickness of the measuring tube at the pertinent site.

German Patent Application 10 2008 057 755 A1, which corresponds to U.S. Pat. No. 8,286,503 B2, for example, discloses that a flow cross section of an inlet-side end of an inflow section decreases toward a measurement section and an outlet-side flow cross section of the measurement section increases, in turn, to the outlet-side flow cross section of the outflow section of a measuring tube. The change of the cross section has the advantage that the flow velocity of the measurement fluid is increased in the region of the measurement section and, accordingly, a greater effect is also achieved for the charge separation as a result of the magnetic field in the measurement section.

The variable cross sectional geometry of the measuring tube beyond its longitudinal extension is achieved in the conventional art by comparatively complex production techniques, for example by casting a corresponding metal measuring tube, by internal high pressure forming or by injection molding of a plastic measuring tube. The production effort and the associated costs have, for a long time, prevented the use of magnetic-inductive flow meters for low cost, mass applications, for example as domestic water meters. This is due not only to the production costs associated with the measuring tube, but also to the altogether comparatively demanding hardware and measurement-engineering structure of a magnetic-inductive flow meter.

SUMMARY OF THE INVENTION

The primary object of this invention is to provide a magnetic-inductive flow meter with a measuring tube in which a high measurement sensitivity and measurement accuracy are structurally supported, and, moreover, a measuring tube that is easily and thus economically producible.

The aforementioned object is achieved in a magnetic-inductive flow meter with a measuring tube in which a distance between the electrode sections in the measurement section of the measuring tube is greater than the largest inside diameter of the inlet-side flow cross section of the inflow section of the measuring tube. The distance between the electrode sections in the measurement section of the measuring tube means the distance from wall to the wall of the measuring tube in the sections in which there are electrodes, regardless of the insulating linings of the measuring tube in this section, and also regardless of possible recesses in the measuring tube into which the electrodes are inlet. When the inside diameter of the inlet side flow cross section of the inflow section is referred to herein, it is then assumed that the inlet-side flow cross section of the inflow section is the area of a circle. This results solely from the fact that magnetic-inductive flow meters must be connected to pipes with a circular cross section of the process system and, thus, in contrast to the flow cross section in the measurement section having circular or circular area flow cross sections and, thus, have only a single inside diameter there.

The great distance between the electrode sections in the measurement section of the measuring tube widens the distance available to charge separation beyond the amount that has been conventionally practiced, and, of added importance, the area over which a magnetic field can be introduced into the medium is increased beyond the conventional amount. This is because, conventionally, pole shoes of the magnetic circuit device are provided on the wall sections of the measurement section which are perpendicular to the electrode sections in the measurement section of the measuring tube. This aspect of the invention increases the sensitivity of the magnetic-inductive flow meter in a geometrical-structural manner and improves the measurement accuracy since, at the distances between electrode sections disclosed herein, a largely homogeneous magnetic field is produced over large parts of the volume in the measurement section.

In embodiments of the magnetic-inductive flow meter and its measuring tube in accordance with the aspects of invention, the flow cross section of the measurement section is essentially rectangular and has a length/width ratio of greater than 3:1 and, in implementations, greater than 3.5:1. In these length/width ratios, the length is defined as the distance between the electrode sections in the measurement section of the measuring tube. Implementations of this design standard result in an unusually flat flow channel which promotes flow conditions that have improved measurement accuracy. The short walls which define the "width" accommodate the electrode sections and on the "long" walls which are essentially perpendicular thereto there are, in implementations, the opposite poles of the magnetic circuit device. Especially good results are achieved with implementations having a length/width ratio of 3.74:1.

In embodiments of the magnetic-inductive flow meter and of the measuring tube for this flow meter, the ratio of the inlet-side flow cross section of the inflow section to the flow cross section of the measurement section is greater than 1.8:1, and, in implementations, greater than 2.0:1, and, in implementations, greater than 2.2:1. It has been found that, at the large distance between the sections of the electrode in the measurement section of the measuring tube, a relatively speedy tapering of the flow cross section can be implemented without adversely affecting the flow in the measurement section of the measuring tube. This applies especially in conjunction with the aforementioned length/width ratio of the flow cross section in the measurement section.

Embodiments of magnetic-inductive flow meter in accordance with aspects of invention are fundamentally suited for use for all connection-side nominal widths, but are especially suitable for connection-side nominal widths of the measuring tube which are smaller than a 10 mm, and, in implementations, smaller than 40 mm. This is due to the fact that the extension of the measurement section beyond the outside dimension of the inlet-side flow cross section between the electrode sections for magnetic-inductive flow meters of these sizes is not perceived as disruptive, since, for example, a housing can be easily produced to be so large that it also still encompasses the geometry of the measurement section which is discharging something. This may be a problem in magnetic-inductive flow meters with much greater nominal diameters.

In particular, there are now various possibilities for configuring and developing the magnetic-inductive flow meter according to aspects of the invention and the measuring tube for this flow meter according to aspects of the invention. In this respect, reference is made to the description of exemplary embodiments in conjunction with the drawings.

DETAILED DESCRIPTION OF THE INVENTION

Figure 1:
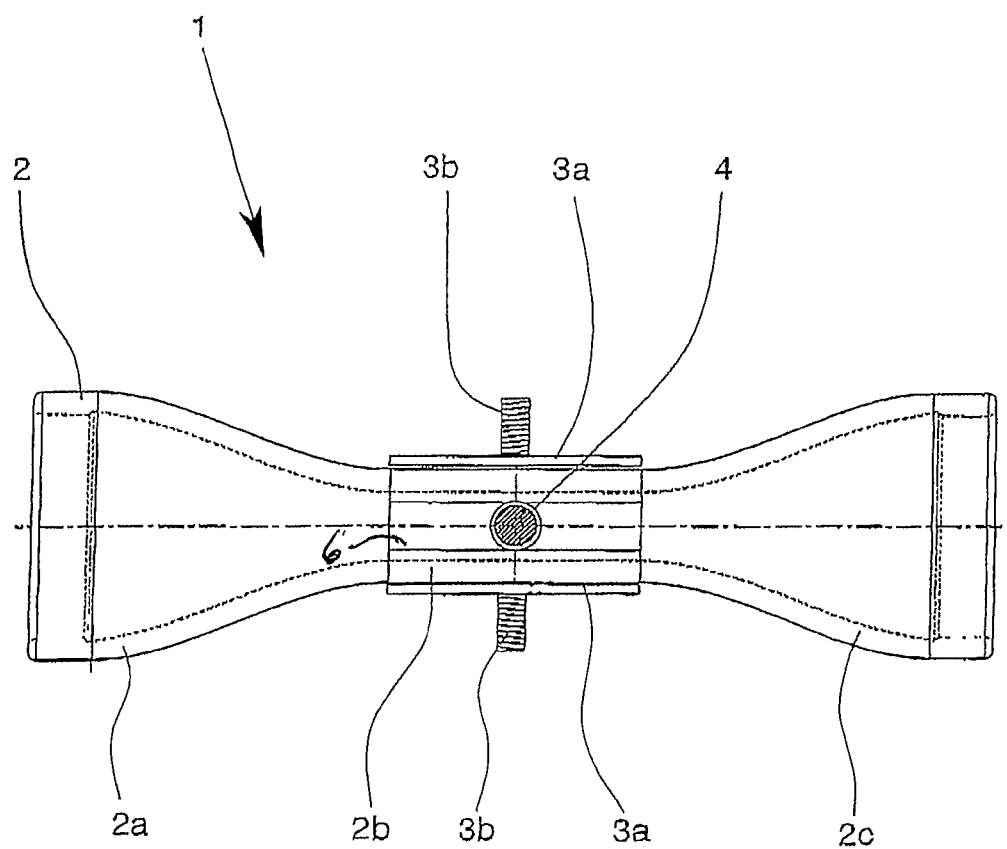
FIG. 1 shows a magnetic-inductive flow meter.

FIG. 1 shows a magnetic-inductive flow meter 1 with a measuring tube 2 and with a magnetic circuit device 3 for implementing a magnetic circuit and with two electrodes, of which only one electrode 4 is visible in the drawings. The electrodes 4 are used to detect a measurement voltage, which is established when a conductive medium is flowing through the measuring tube 2. Then, in the medium, a charge separation is established in the direction of the electrodes 4, when the magnetic circuit device 3 generates a magnetic field perpendicular to the flow direction and perpendicular to the imaginary axis of the opposing electrodes 4. In the exemplary embodiment shown in FIG. 1, the magnetic circuit device 3 consists of two opposing pole plates 3a with one coil 3b each, which are energized by trigger electronics that are not detailed here. Likewise the magnetic closing of the magnetic circuit device is not explicitly shown.

Figure 2:
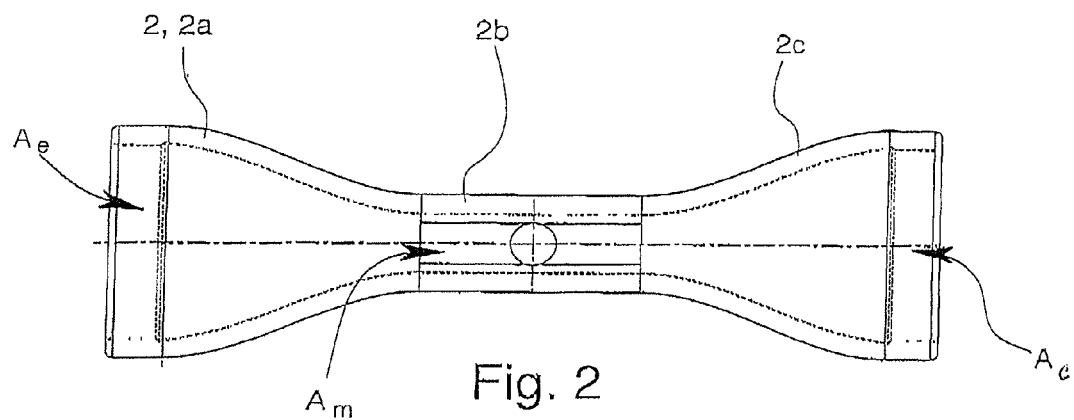
FIG. 2 is a sectional view of a measuring tube of the magnetic-inductive flow meter according to FIG. 1.
Figure 3:
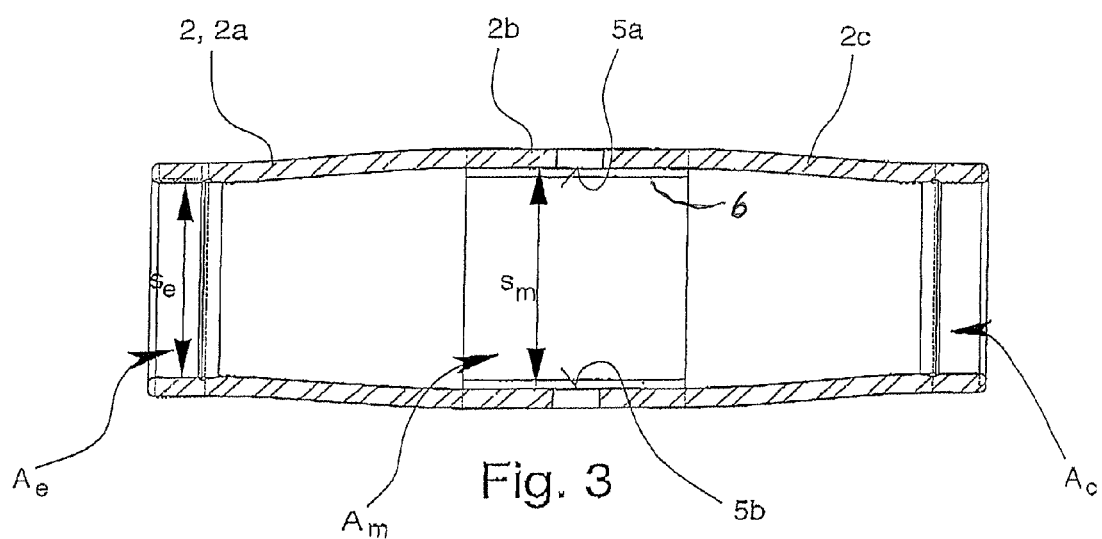
FIG. 3 is a sectional side view of the measuring tube according to FIG. 2.
Figure 4:
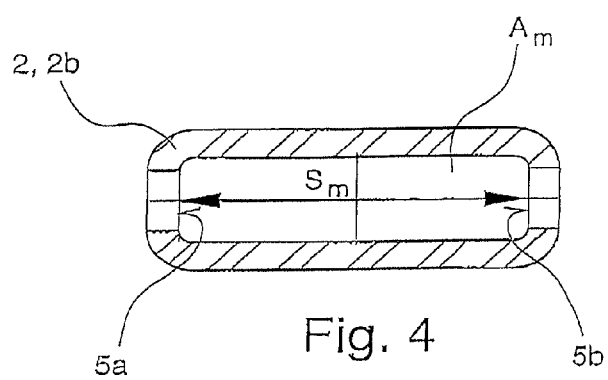
FIG. 4 shows the cross section of the measurement section of the measuring tube according to FIGS. 1 to 3 in the region of the electrodes.

FIGS. 2 to 4, in contrast to FIG. 1, show only the measuring tube in order to emphasize its structural particulars.

In FIGS. 1 to 4, the measurement 2 has an inflow section 2a, a measurement section 2b adjoining the inflow section 2a and an outflow section 2c, which adjoins the measurement section 2b. As can be easily recognized, the flow cross section A of the measuring tube 2 changes greatly over the longitudinal extension of the measuring tube 2 and, therefore, in the throughflow direction. The flow cross section $A_m$ of the measurement section 2b is both smaller than the inlet-side flow cross section $A_e$ of the inflow section 2a and also smaller than the outlet-side flow cross section $A_c$ of the outflow section 2c.

The electrodes 4 are located on or in opposite electrode sections 5a, 5b in the measurement section 2b of the measuring tube 2, where they contact the electrical potentials arising due to charge separation and make them available as measurement voltage.

As is especially apparent from FIG. 3, the measuring tube 2 shown in the figures is characterized in that the distance $s_m$ between the electrode sections 5a, 5b in the measurement section 2b of the measuring tube 2 is larger than the inside diameter $s_o$ of the inlet-side flow cross section $A_c$ of the inflow section 2a of the measuring tube 2. By the distance $s_m$ between the electrode sections 5a, 5b in the measurement section 2b being increased relative to the inside diameter $s_o$ of the inlet-side flow cross section $A_c$, the distance of effective charge separation and, thus, the effective measurement sensitivity of the magnetic-inductive flow meter 1 is increased. At the same time, with the widening of the flow cross section, the possible supporting and action surface for the pole shoes 3a of the magnetic circuit device 3 is increased.

As can be clearly discerned from FIG. 4, but as also follows from examining FIGS. 2 & 3 together, the flow cross section $A_m$ of the measurement section 2b is essentially rectangular and, in this case, has a length/width ratio of roughly 3.7. The distance $s_m$ between the electrode sections 5a, 5b in this exemplary embodiment is, therefore, approximately four times greater than the height of the inside cross section. For a flow cross section $A_m$ of the measurement section 2b configured in this way, a favorable flow profile is achieved. This advantageously affects the attainable measurement accuracy. "Essentially rectangular" in this connection means than the flow cross section $A_m$ of the measurement section 2b is bordered for the most part by wall surfaces which run in pairs parallel to one another. The wall surfaces, however, pass into one another at the junction points only at a certain radius of curvature. The flow cross section $A_m$ of the measurement section 2b is unchanged in the exemplary embodiment shown here over the longitudinal extension of the measurement section 2b so that a smooth flow without unnecessary perturbations can be established in the measurement section 2b.

In the exemplary embodiment shown in the figures, the ratio of the inlet-side flow cross section $A_c$ of the inflow section 2a to the flow cross section $A_m$ of the measurement section 2b is roughly 2.2. Therefore, a considerable reduction of the flow cross section results. The illustrated structural layout is characterized in that the flow profile is, nevertheless, particularly suited for a high-quality flow rate measurement.

The inflow section 2a is shaped such that it has a continuously decreasing flow cross section in a single coherent reducing region without sudden changes in cross section and without phases remaining in a constant flow cross section. The same applies analogously to the outflow section 2c, which in a single coherent expansion region has a continuously increasing flow cross section which finally ends in the outlet side flow cross section $A_e$ which is then kept constant over a short distance. However, this region of the constant outflow cross section $A_c$ is no longer included in the expansion region.

The configuration of the measurement section 2b of the measuring tube 2 allows an especially short construction of the entire measuring tube 2. In the exemplary embodiment shown in the figures the ratio of the longitudinal extension of the measurement section 2b to the longitudinal extension of the reducing region and the ratio of the longitudinal extension of the measurement section 2b to the longitudinal extension of the expansion region is settled at roughly 0.9 mm. The connection-side nominal width of the measurement tube 2 is 15 mm. The distance $s_m$ between the electrode sections 5a, 5b in the illustrated exemplary embodiment is 17.2 mm. The flow meter with the described dimensions is particularly useful, e.g., for registering water consumption in amounts conventional for households and, therefore, as a domestic water meter.

In embodiments, the measurement tube 2 is made of a metal pipe of nonmagnetic material. The reducing region of the inlet section 2a, the expansion region of the outlet section 2c, and the measurement region 2b are produced without cutting by forces acting from outside on the pipe. The pipe geometry can, therefore, be very easily produced without expensive production methods, such as casting or internal high pressure forming. As such, the production costs compared to conventional measuring tubes for the illustrated magnetic-inductive flow meters are very low and thus also a use of these magnetic-inductive flow meters with these measuring tubes for mass applications in the low cost domain is possible.

FIGS. 1 to 3 show that the measuring tube 2 in the measurement section 2b has a nonconductive lining 6 which can be omitted in other exemplary embodiments in which the measuring tube itself is not electrically conductive.

What is claimed is:
1. A magnetic-inductive flow meter comprising:
 a measuring tube;
 a magnetic circuit device;
 at least two electrodes for detecting a measurement voltage;
 wherein:
  the measuring tube includes an inflow section, a measurement section adjoining the inflow section, and an outflow section adjoining the measurement section;
  a flow cross section of the measurement section is smaller than an inlet-side flow cross section of the inflow section, and smaller than an outlet-side flow cross section of the outflow section;
  the electrodes are located on or in opposite electrode sections in the measurement section of the measuring tube; and
  a distance between the electrode sections in the measurement section of the measuring tube is greater than an inside diameter of the inlet-side flow cross section of the inflow section of the measuring tube so as to produce a largely homogeneous magnetic field over large parts of the volume in the measurement section.

2. The magnetic-inductive flow meter recited in claim 1, wherein the flow cross section of the measurement section is rectangular and has a length/width ratio greater than about 3:1.

3. The magnetic-inductive flow meter recited in claim 2, wherein the length/width ratio is greater than about 3.5:1.

4. The magnetic-inductive flow meter recited in claim 2, wherein the length/width ratio is greater than about 3.74:1.

5. The magnetic-inductive flow meter recited in claim 1, wherein the flow cross section of the measurement section is unchanged over a longitudinal extension of the measurement section.

6. The magnetic-inductive flow meter recited in claim 1, wherein a ratio of the inlet-side flow cross section of the inflow section to the flow cross section of the measurement section is greater than about 1.8:1.

7. The magnetic-inductive flow meter recited in claim 6, wherein the ratio of the inlet-side flow cross section of the inflow section to the flow cross section of the measurement section is greater than about 2.0:1.

8. The magnetic-inductive flow meter recited in claim 6, wherein the ratio of the inlet-side flow cross section of the inflow section to the flow cross section of the measurement section is about 2.2:1.

9. The magnetic-inductive flow meter recited in claim 1, wherein the inflow section has a continuously decreasing flow cross section in a single coherent reducing region.

10. The magnetic-inductive flow meter recited in claim 1, wherein the outflow section has a continuously increasing flow cross section in a single coherent expansion region.

11. The magnetic-inductive flow meter recited in claim 1, wherein a ratio of a longitudinal extension of the measurement section to a longitudinal extension of a reducing region or the ratio of the longitudinal extension of the measurement section to a longitudinal extension of an expansion region is smaller than about 1.1:1.

12. The magnetic-inductive flow meter recited in claim 11, wherein the ratio of the longitudinal extension of the measurement section to the longitudinal extension of the reducing region or the ratio of the longitudinal extension of the measurement section to the longitudinal extension of the expansion region is smaller than about 1.0:1.

13. The magnetic-inductive flow meter recited in claim 11, wherein the ratio of the longitudinal extension of the measurement section to the longitudinal extension of the reducing region or the ratio of the longitudinal extension of the measurement section to the longitudinal extension of the expansion region is smaller than about 0.9:1.

14. The magnetic-inductive flow meter recited in claim 11, wherein the ratio of the longitudinal extension of the measurement section to the longitudinal extension of the reducing region or the ratio of the longitudinal extension of the measurement section to the longitudinal extension of the expansion region is smaller than about 0.89:1.

15. The magnetic-inductive flow meter recited in claim 1, wherein a connection-side nominal width of the measuring tube is smaller than about 40 mm.

16. The magnetic-inductive flow meter recited in claim 15, wherein the connection-side nominal width of the measuring tube is smaller than about 30 mm.

17. The magnetic-inductive flow meter recited in claim 15, wherein the connection-side nominal width of the measuring tube is about 15 mm.

18. The magnetic-inductive flow meter recited in claim 1, wherein the measurement tube is made of a metal pipe of nonmagnetic material.

19. A measuring tube for a magnetic-inductive flow meter comprising:
  an inflow section;
  a measurement section that adjoins the inflow section;
  an outflow section that adjoins the measurement section;
  a flow cross section of the measurement section that is smaller than an inlet-side flow cross section of the inflow section and smaller than an outlet-side flow cross section of the outflow section; and
  recesses for electrodes in opposite electrode sections in the measurement section of the measuring tube,
  wherein a distance between the electrode sections in the measurement section of the measuring tube is greater than an inside diameter of an inlet-side flow cross section of the inflow section of the measuring tube.

* * * * *